(12) United States Patent
Wirtanen et al.

(10) Patent No.: US 7,422,398 B2
(45) Date of Patent: Sep. 9, 2008

(54) INSIDE MACHINING CUTTING TOOL DELIVERY APPARATUS

(75) Inventors: John R. Wirtanen, Shelby Township, MI (US); Robert B. Peuterbaugh, Macomb, MI (US)

(73) Assignee: Joint Production Technology, Inc., Macomb, MI (US)

( * ) Notice: Subject to any disclaimer, the term of this patent is extended or adjusted under 35 U.S.C. 154(b) by 366 days.

(21) Appl. No.: 11/285,617

(22) Filed: Nov. 21, 2005

(65) Prior Publication Data

US 2007/0116533 A1 May 24, 2007

(51) Int. Cl.
*B23C 3/00* (2006.01)
*B23C 5/00* (2006.01)
*B23B 41/00* (2006.01)
(52) U.S. Cl. ............... 409/143; 409/234; 29/558
(58) Field of Classification Search ................ 409/143, 409/234, 138, 140, 199, 131, 132, 232; 408/54, 408/203.5, 707, 708, 93, 211, 79, 80, 81, 408/82, 83.5; 29/557, 558, 559, 563, 406
See application file for complete search history.

(56) References Cited

U.S. PATENT DOCUMENTS

| 2,372,913 | A | * | 4/1945 | Schmidt ............... 409/143 |
| 4,022,539 | A | | 5/1977 | Peuterbaugh |
| 4,033,207 | A | | 7/1977 | Peuterbaugh |
| 4,141,279 | A | * | 2/1979 | Abel et al. .............. 409/143 |
| 4,400,859 | A | * | 8/1983 | Woythal et al. .......... 409/143 |
| 4,557,644 | A | * | 12/1985 | Scepanovic et al. ........ 409/143 |
| 5,066,178 | A | | 11/1991 | Peuterbaugh |
| 5,086,676 | A | | 2/1992 | Gifford et al. |
| 5,207,749 | A | * | 5/1993 | Ariyoshi ............... 409/143 |
| 5,211,088 | A | | 5/1993 | Gifford |
| 5,232,317 | A | | 8/1993 | Peuterbaugh |
| 5,341,710 | A | | 8/1994 | Peuterbaugh |
| 5,628,589 | A | | 5/1997 | Peuterbaugh |
| 5,664,917 | A | * | 9/1997 | Judy .................. 409/143 |

(Continued)

OTHER PUBLICATIONS

International Search Report and Written Opinion dated Sep. 24, 2007 from the corresponding International Patent Application No. PCT/US06/44132.

*Primary Examiner*—Dana Ross
(74) *Attorney, Agent, or Firm*—Young Basile

(57) ABSTRACT

An apparatus can deliver a static cutting tool to a position located inside a workpiece to be machined. The cutting tool can be used for machining at least one surface inside of the workpiece. The cutting tool is operable in combination with an electronic controlled machine tool having at least one axially movable drive/support spindle. A cutting tool body can have at least one cutter and an aperture adapted for receiving the axially movable drive/support spindle of the electronic controlled machine tool. A movable carriage can be used for releasibly supporting the tool body and for transporting the tool body between a home position, where the tool body is spaced from coaxial alignment with the axially movable drive/support spindle of the electronic controlled machine tool, and a ready position, where the aperture of the tool body is in a coaxially aligned position with respect to the axially movable drive/support spindle of the electronic controlled machine tool. The carriage can be used for transferring support of the cutting tool body with respect to the movable drive/support spindle of the electronic controlled machine tool when the carriage is in the ready position.

22 Claims, 5 Drawing Sheets

U.S. PATENT DOCUMENTS

| | | | |
|---|---|---|---|
| 6,183,404 B1 * | 2/2001 | Deufel | 483/1 |
| 6,220,794 B1 * | 4/2001 | Calamia et al. | 407/40 |
| 6,722,826 B2 * | 4/2004 | Cavanaugh | 409/143 |
| 7,096,563 B2 * | 8/2006 | Walz | 409/143 |
| 2004/0226154 A1 | 11/2004 | Walz | |

* cited by examiner

INSIDE MACHINING CUTTING TOOL DELIVERY APPARATUS

FIELD OF THE INVENTION

The present invention relates to a cutting tool delivery apparatus for delivering a static cutting tool to an axially and radially located position inside a workpiece to be machined, the tool for machining at least one inside surface of the workpiece, where the tool is operable in combination with an electronic controlled machine tool, such as by way of example and not limitation a programmable controller (PC) or computer numerical controller (CNC), having at least one axially movable drive/support spindle engagable with a drive aperture formed in the cutting tool after delivery of the cutting tool to a predetermined location inside the workpiece.

BACKGROUND

Known cutting tools for machining inside surfaces of parts, such as by way of example and not limitation differential cases, provide a support bracket or hanger for carrying the cutting tool to the location where machining of a surface on the workpiece is desired. When located at the desired location, a drive/support spindle engages the cutting tool to perform the machining operation, while the cutting tool is still supported by the support bracket or hanger. The delivery of the cutting tool to the desired location by the support bracket or hanger requires large openings or apertures in the workpiece and/or convoluted shapes and/or delivery paths to reach the necessary location for machining the desired surface on the workpiece. The large openings or apertures can cause structural problems with the workpiece that can require special engineering of the part thereby increasing the cost of the part, or can require special engineering of the support bracket or hanger. thereby increasing the cost of the cutting tool delivery machine.

SUMMARY

It would be desirable in the present invention to provide a cutting tool delivery apparatus for delivering a static cutting tool to an axially and radially located position inside a workpiece to be machined without requiring large openings or apertures formed in the workpiece and/or a convoluted shape of the support bracket or hanger and/or convoluted tool delivery paths. According to the present invention, the cutting tool delivery apparatus can deliver a cutting tool to a predetermined position, radially and axially located inside the workpiece to be machined, and can transfer the cutting tool to be supported by the drive/support spindle during the machining operation. The relative position of the workpiece and/or the drive/support spindle can be controlled by a programmable controller (PC) or computer numerical controller (CNC) controlled machine (generically referred to herein as an electronic controlled machine or machine tool) to engage the cutting tool with the desired surfaces of the workpiece to be machined. The present invention discloses a tool for machining at least one inside surface of the workpiece. The tool according to the present invention can be operated in combination with a PC or CNC controlled machine having at least one axially movable drive/support spindle engagable with a drive aperture formed in the cutting tool after delivery of the cutting tool to the predetermined location inside the workpiece. The tool carrier according to the present invention can be releasibly connected to the cutting tool for movement between a retracted or home position spaced from axial alignment with the drive/support spindle and an extended or ready position in axial and radial alignment with the drive/support spindle. When in the ready position, support of the cutting tool can be transferred to or from the drive/support spindle. When transferring to the drive/support spindle, the drive/support spindle is manipulated to engage through a drive aperture formed in the cutting tool body. When transferring from the drive/support spindle, the drive/support spindle is manipulated to disengage from the drive aperture formed in the cutting tool body. The tool carrier can include at least one releasable spear member for supporting the cutting tool body.

The present invention can be an integrated automation module that connects to an electronic controlled machine tool, such as by way of example and not limitation a PC or CNC controlled station and can provide at least one optional sensor/switch/signal back to the electronic controlled machine tool, by way of example such as a CNC controller, or a computerized controller, or central processor controller, or a networked controller, or a programmable controller (PC). The CNC station typically can have a two axis CNC turning machine with sub-spindle. The machine tool according to the present invention can be manual, transfer, rotary dial, milling, turn-mill, tail stock or any combination of configurations including multi-axis or single-axis that are CNC or PC controlled. The present invention can attach to a fixture with the flexibility of tool insertion with radial orientation to accommodate any angle of attitude required for part machining. The present invention is designed to be quick changed to accommodate many different parts. Families of parts or unrelated non-families of parts can all be machined through the flexibility of a post and/or cap arrangement of fixture quick-change. Other quick-change methods of attachments are subject to the unique CNC station requirements. The present invention can be actuated by a myriad of different methods, by way of example and not limitation, including a gear and rack combination, and can be power-driven by manual operator intervention, air, coolant, electrical motor and/or hydraulics. The present invention can automate insertion of the cutting tool body, by way of example and not limitation, a spherical seat cutter, a side gear cutter, and/or other miscellaneous tooling into a part to be machined. By way of example and not limitation, the part to be machined can be a differential gear case workpiece-or body.

In operation, the present invention can include the process steps of positioning a cutting tool inside a part. The positioning step can begin with an advance sequence of steps. This cycle can axially and radially position a static cutting tool in a predetermined position inside the part to be machined. After the tool is positioned, static drive radially oriented arbors or spindles are advanced into the cutting tool body producing engagement via at least one pair of complementary surfaces engagable with one other, by way of example and not limitation, such as a plurality of male to female splines or drives. After engaging the cutting tool body with the arbors, the supporting bracket and/or at least one support spear can be retracted from the corresponding cutting tool aperture in order to transfer support of the cutting tool body from the tool carrier to the arbors, and during the machining process leaving the cutting tool body on the arbors inside the part to be machined. The rotation of the spindles can be started, initiating tool rotation, and the machining process can be accomplished. After completion of the machining process, a retract sequence of steps can be initiated. This cycle can be performed in reverse order of the advance sequence in order to transfer the cutting tool body from the arbors to the at least one supporting bracket and/or at least one spear of the tool carrier for removal from the machined part.

The present invention can include at least one sensor and/or switch to determine if the cutting tool body is connected to the at least one support bracket and/or at least one spear of the tool carrier. The cutting tool body can be oriented in a desired angular position with respect to the arbors and delivered in the same orientation for engagement with the supporting bracket or spear of the tool carrier. The present invention can include at least one system ready sensor and/or switch to determine if the cutting tool body is properly located in the predetermined position inside the part to be machined. The present invention can include cross pin aperture cutters located on the drive arbors. The present invention can include bushings for the drive arbors located in the workpiece fixture. The present invention can include tool free changeover of the cutting tool body and/or the at least one supporting spear, and/or the at least one sensor/switch. The present invention can include a tool change or inspection position in addition to the home and ready positions. The present invention can include quick change connections, by way of example and not limitation, such as an ear and post configuration. The present invention can include, by way of example and not limitation, system coolant through at least one guide bar. The present invention can include an adjustable angular mount for manual and/or automated angular adjustment of the delivery angle of the cutting tool body with respect to the part to be machined. The present invention can include at least one shock absorber operable adjacent at least one end of travel of the reciprocal tool carrier, or at least one shock absorber operable adjacent each end of travel of the reciprocal tool carrier.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 3:
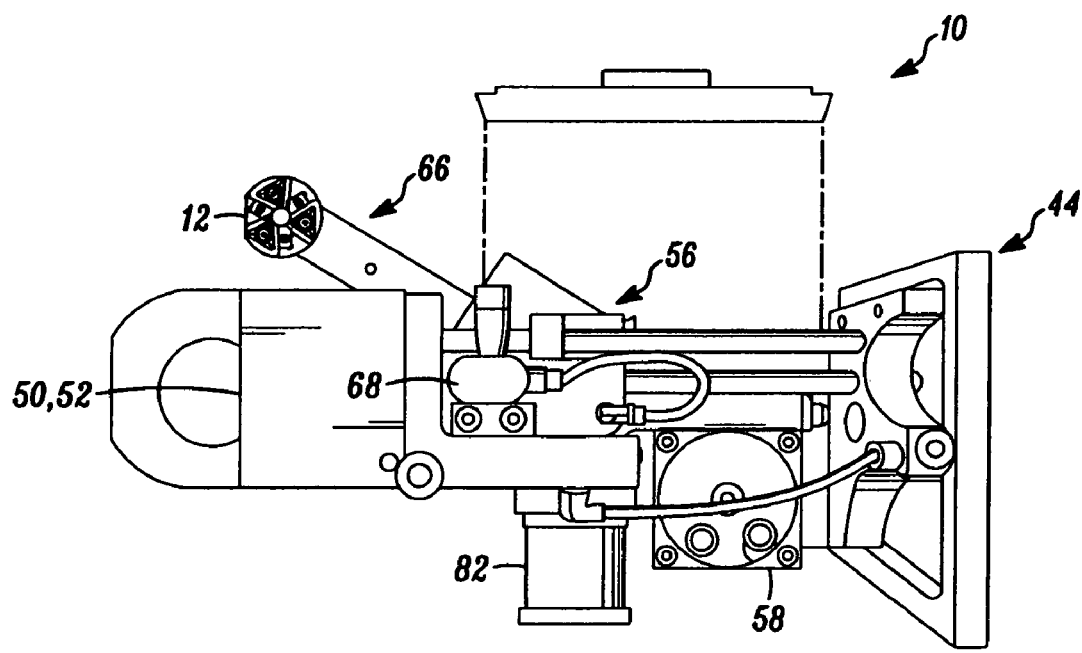
FIG. 3 is a side elevational view of the apparatus according to the present invention with the carriage in a tool change, inspection or service position.
Figure 4:
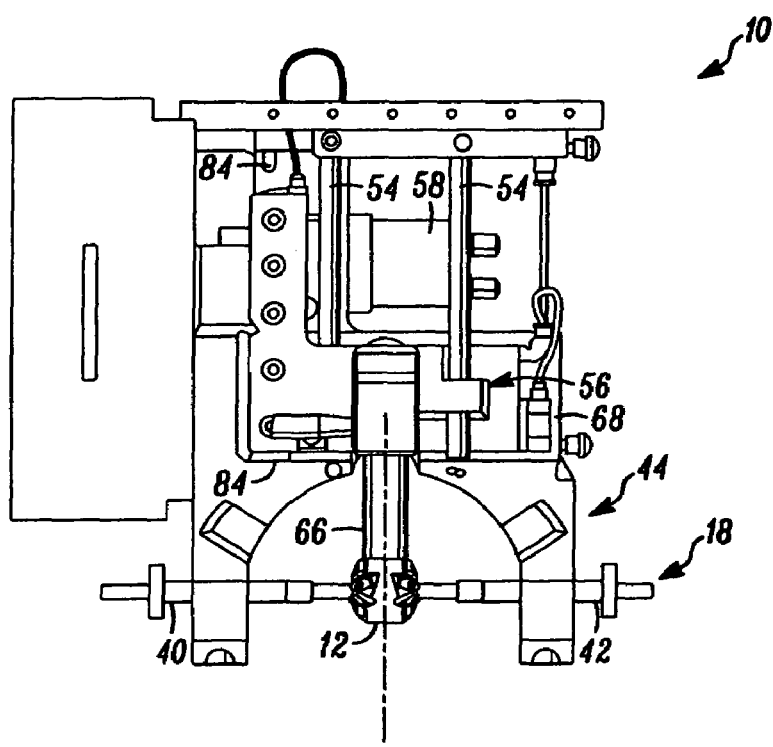
FIG. 4 is a simplified plan view of the apparatus according to the present invention with the carriage in the ready position and the spindle or arbor of the electronic controlled machine engaging through the aperture of the cutting tool body.
Figure 5:
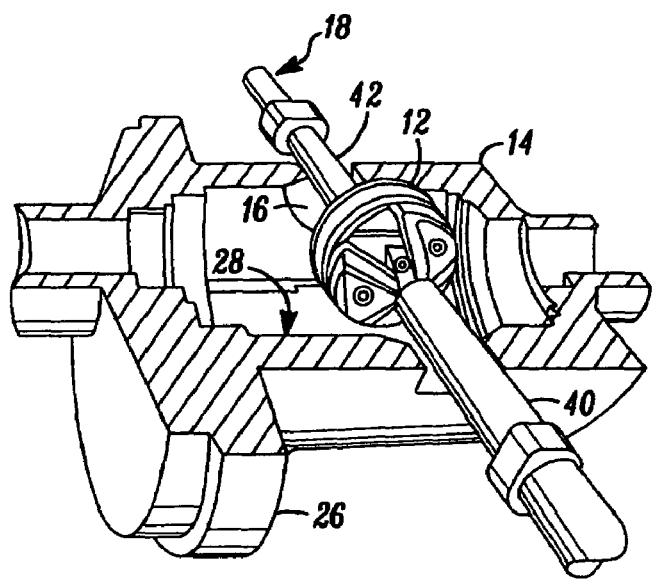
FIG. 5 is a simplified perspective view of the cutting tool body supported on the drive/support spindles of the electronic computer controlled machine tool for machining at least one inside surface of a workpiece shown in partial cross section, by way of example and not limitation, such as a differential case.
Figure 6:
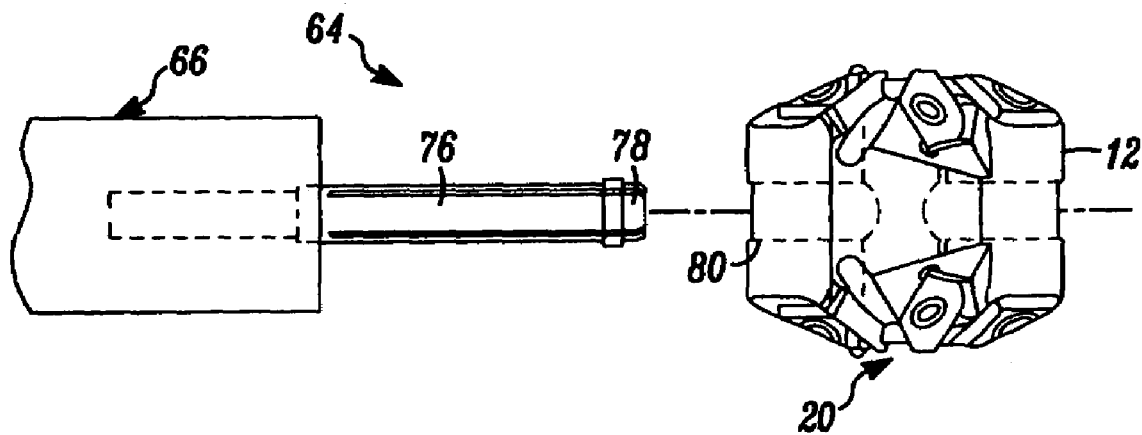
FIG. 6 is a detailed plan view of one configuration of at least one mounting spear, or combination of a collet and retainer knob adjacent on outer end, for releasibly mounting the cutting tool.
Figure 7:
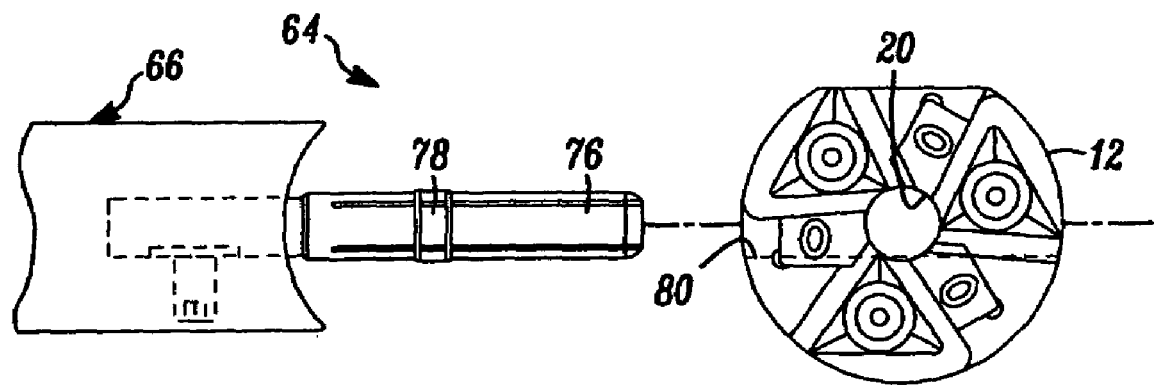
FIG. 7 is a detailed side view of the at least one mounting spear or collet for releasibly receiving the cutting tool illustrated by way of example and not limitation in plan view in FIG. 6 shown with the retainer knob moved from the outer end to an intermediate position of the mounting spear or collet.

Referring now to FIGS. 1-5, an apparatus 10 according to the present invention is well suited for machining an inside surface of a part, by way of example and not limitation, such as a differential case part, spherical seat, side gear, and/or pin hole shaft bore. The machining operation can be performed sequentially or simultaneously as desired for the particular application. A cutting tool delivery apparatus 10 according to the present invention can deliver a static cutting tool 12 to a ready position located axially and radially inside a workpiece 14 to be machined. The cutting tool 12 can be used for machining at least one inside surface 16 of the workpiece 14 as best seen in FIG. 5. The cutting tool 12 is operable in combination with a PC or CNC controlled (CNC) machine having at least one axially moveable drive/support spindle or arbor 18 engagable with a drive aperture 20 formed in the cutting tool 12. The arbor 18 can engage within the drive aperture 20 after the cutting tool 12 has been delivered to the ready position inside the workpiece 14 as best seen in FIGS. 5-7.

Typically, CNC machines include a workpiece nest 22 specifically configured for a particular configuration of workpiece to be processed. For purposes of illustration, a workpiece nest 22 for a differential case workpiece 14 will be described. The workpiece nest 22 can include an upper surface 24 for receiving a flange 26 associated with the workpiece 14 and can be designed to orientate the workpiece 14 with a sidewall aperture 28 aligned with an aperture 30 formed in the wall 32 of workpiece nest 22. The workpiece nest 22 includes outwardly extending sleeves 34, 36 on opposite sides of the nest 22 diametrically opposed to one another. A coaxial aperture 38 extends through each of the outwardly extending sleeves 34, 36 allowing inward passage of the drive arbors or spindles 40, 42 of the CNC machine.

The cutting tool delivery apparatus 10 can include a frame 44 mounted on the outer periphery of the outwardly extending sleeves 34, 36. The frame 44 can be adjusted, manually or automatically, into a desired angular position with respect to a longitudinal axis of the coaxial aperture 38. The outwardly extending sleeves 34, 36 can be provided with at least one coplanar pair of flats 46 engagable with flat surfaces 50, 52 associated with the frame 44 for simplifying proper alignment and orientation of the frame 44 with respect to the workpiece nest 22. Additional coplanar pairs of flats can be provided at different angular orientations with respect to the longitudinal axis of the coaxially aperture 38 through the workpiece nest in order to orientate the frame 44 at different angular positions with respect to the longitudinal axis of the coaxially aperture 38 and outwardly extending sleeves 34, 36 or the sleeves 34, 36 and be rotatable with respect to the wall 32 of the nest 22. The frame 44 supports at least one guide rail 54 best seen in FIGS. 1 and 3. In the illustrated configuration, two guide rails 54 are provided connected to the frame 44 for guiding reciprocal motion of carriage 56 between a ready position illustrated in FIG. 4 and a home position spaced radially from the longitudinal axis of the coaxial aperture 38 through the workpiece nest 22. The carriage 56 can operably slide in guided movement along guide rails 54 in response to actuation of a drive 58 for moving the carriage 56 between the home position and the ready position. By way of example and not limitation, the drive 58 can include a rack 60 and pinion 62 configuration for driving the carriage 56 between the home position and the ready position. Alternatively, the drive 58 can be powered by any suitable configuration, by way of example and not limitation, such as fluid operated cylinders, hydraulic cylinders, pneumatic cylinders, electric motors, solenoids, hydraulic motors, pneumatic motors, or the like.

Figure 1:
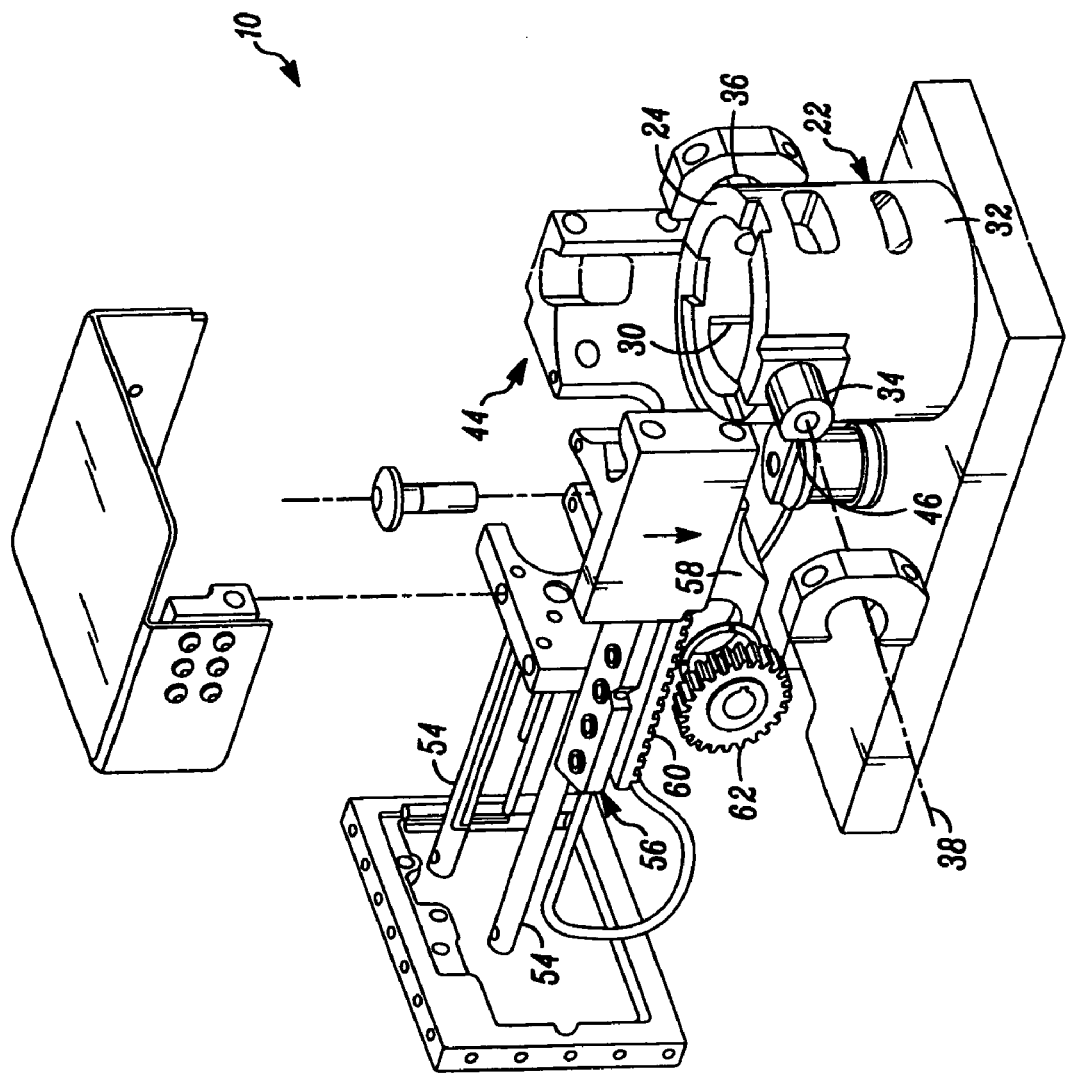
FIG. 1 is an exploded perspective view of an apparatus according to the present invention for delivering a static tool to a located position inside a workpiece to be machined for machining at least one surface inside of the workpiece in combination with an electronic controlled machine tool having at least one arbor or drive/support spindle.
Figure 2:
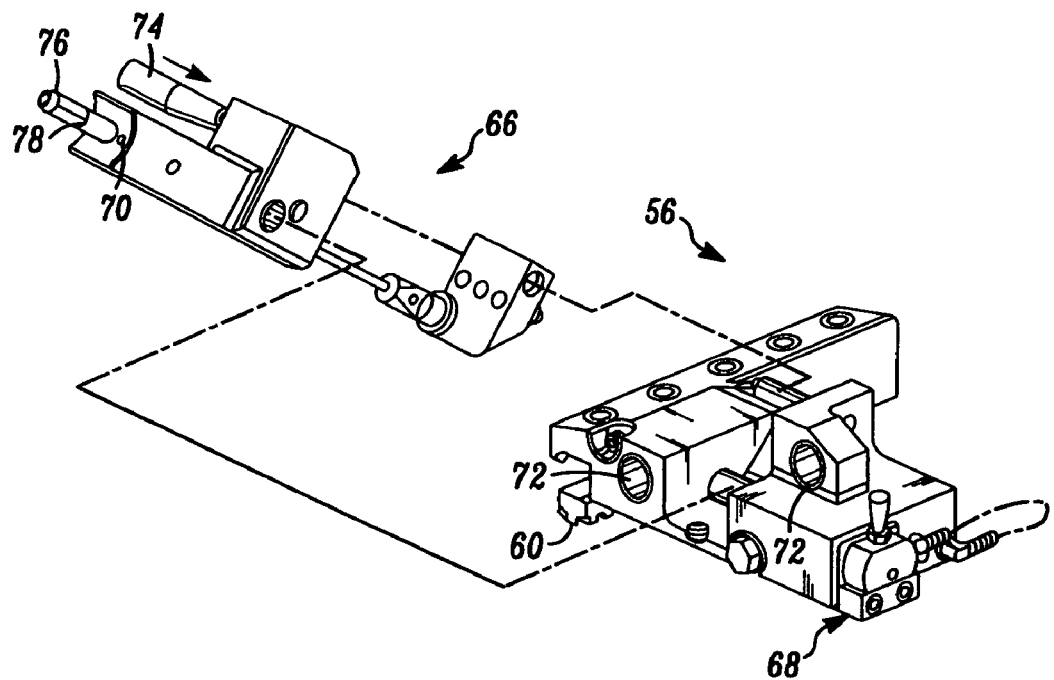
FIG. 2 is a detailed exploded perspective view of a moveable carriage for releasibly supporting a cutting tool body for movement between a home position, a ready position, and/or a service position.

As best seen in FIG. 2, the carriage 56 includes a cutting tool mount or spear(s) 64 located on an outer end of a rotatable Swing Arm Assembly 66. The Swing Arm Assembly 66 can be rotated about an axis in order to position the bracket in a service position, as illustrated in FIG. 3 for removal and/or replacement of the cutting tool 12 mounted on the cutting tool mount 64, and a work position mounted in line with a direction of travel of the carriage 56 between the home position and the ready position in order to pass the cutting tool (proximity) 12 through the aperture 30 formed in the wall 32 of the workpiece nest 22 and through the side wall aperture 28 of the workpiece 14 into alignment with the longitudinal axis of the coaxial aperture 38. A second drive 68 can be provided for rotating the Swing Arm Assembly 66 between the service position and the work position. The second drive 68 can be any suitable drive device known to those skilled in the art, by way of example and not limitation, such as an electric motor, a hydraulic motor, a pneumatic motor, a solenoid, a hydraulic cylinder, a pneumatic cylinder, or the like. A sensor/switch 70 can be provided adjacent the cutting tool mount or spear(s) 64 on the outer end of the Swing Arm Assembly 66 in order to sense the presence of the cutting tool 12 operably engaged with the cutting tool mount or spear(s) 64. By way of example and not limitation, the sensor/switch 70 can take the form of a magnetic reed switch, an electronic pressure sensor/switch, or a pneumatic passage associated with a back pressure monitor, or the like. The carriage 56 can include a guide aperture 72 for sliding engagement with each guide rail 54 supported by the frame 44. The Swing Arm Assembly 66 can be mounted to a shaft 74 for rotation about a longitudinal axis of the shaft 74 in response to actuation of the second drive 68. The Swing Arm Assembly 66 can be moved through an angular arc between the work position, tool change position and the service position shown in FIG. 3.

Referring now to FIGS. 6 and 7, the cutting tool mount or spear(s) 66 can include a collet 76 with or without a cutter-retention knob 78 located along the collet 76. Optionally, at least one mounting spear or collet for releasibly receiving the cutting tool can incorporate, by way of example and not limitation, a cutting tool securing mechanism, such as the retention knob 78, or an interference or friction fit, or an elastic or spring material fit, or extendable and retractable pawls, mechanical fingers, wedges, grippers, claws, or spring biased balls, or magnets, or vacuum, and any combination thereof, or the like. The cutter-retention knob 78 can be positioned adjacent an outer end of the collet 76 as illustrated in FIG. 6, or can be located in any other desired position, by way of example and not limitation, such as generally midway along the longitudinal length of the collet 76 as illustrated in FIG. 7. The cutter-retention knob 78 operably engages and interacts through the mount aperture 80 in the cutting tool 12. The cutting tool 12 can also include a biased retention device for interaction with the knob 78 in order to allow the insertion of the collet 76 through the mount aperture 80 of the cutting tool 12 and to retain the cutting tool 12 in association with the swing arm assembly 66 during movement between the ready position, home position, service position, tool change position and work position until operably released. By way of example and not limitation, a spring biased retention mechanism can be provided to retain the cutting tool 12 on the collet 76 located at an outer end of the retainable swing arm assembly 66. The spring biased retention device can interact with the knob 78 through angled or curved cam or roller surfaces allowing the collet 76 to be inserted through the mount aperture 80 and to be removed from the mount aperture 80 in response to a predetermined longitudinally directed force to insert or withdraw the collet 76 with respect to the mount aperture 80.

Figure 8:
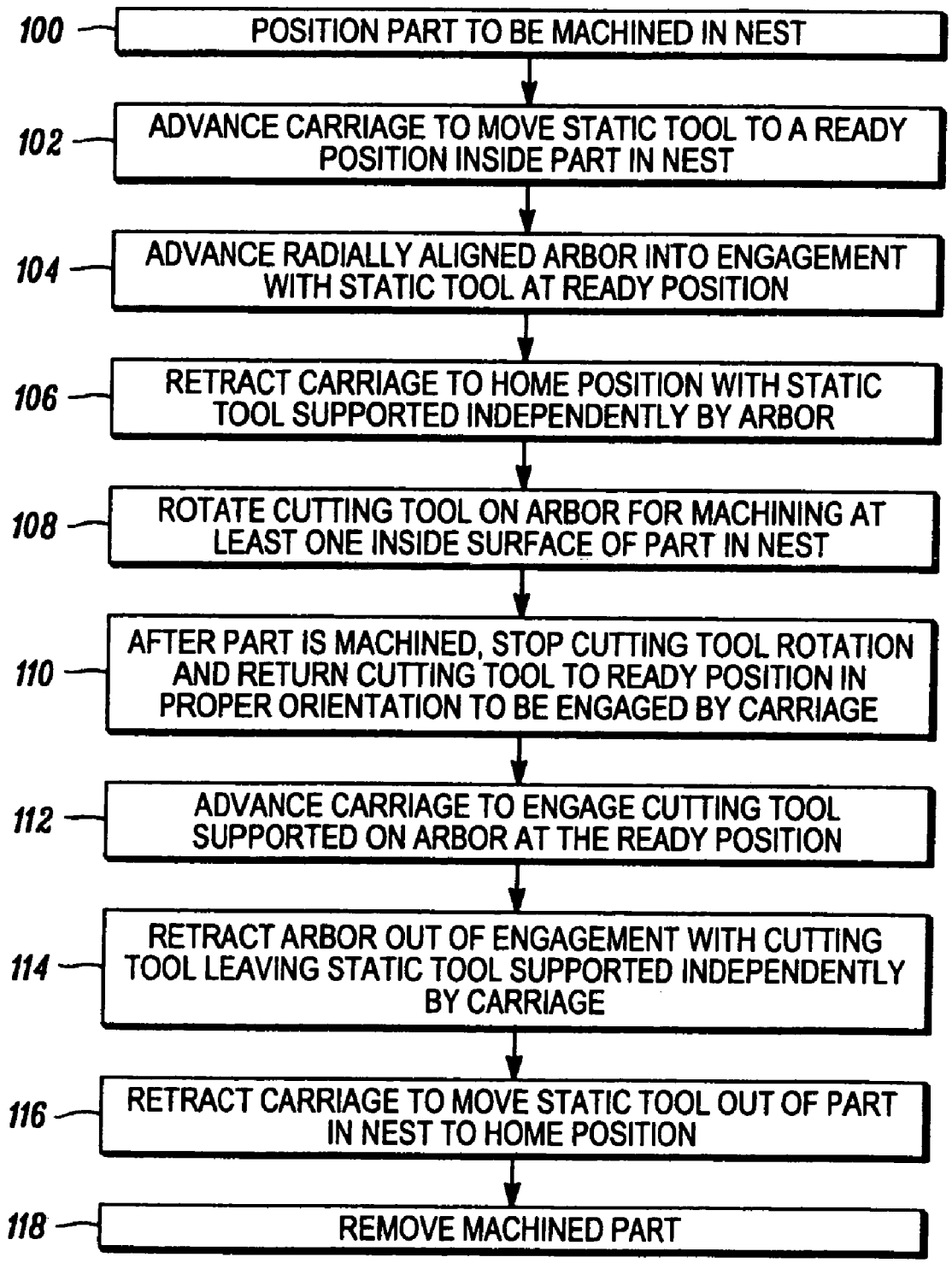
FIG. 8 is a simplified schematic flow diagram of the process operation according to the present invention.

Referring now to FIG. 8, the apparatus 10 according to the present invention can operate to deliver a static cutting tool 12 to a ready position located axially and radially inside a workpiece 14 to be machined. The process of operation can include positioning a part or workpiece 14 to be machined into a workpiece nest 22, either manually or with automated equipment as illustrated in step 100 of FIG. 8. The process continues to step 102 where the carriage 56 can be advanced to move the static cutting tool 12 to a ready position inside the part 14 positioned in the workpiece nest 22. When the static cutting tool 12 is in the ready position inside the workpiece 14, at least one radially aligned arbor or spindle 40, 42 can be advanced into engagement within the coaxially aligned drive aperture 20 formed in the cutting tool 12 as shown in step 104. In step 106, with the drive arbor 40, 42 operably engaged within the drive aperture 20 of the cutting tool 12, the carriage 56 can be retracted to the home position leaving the static cutting tool 12 supported independently by the arbor 40, 42. The process then continues to step 108 where the cutting tool 12 is rotated with the drive arbor 40, 42 for machining at least one inside surface 16 of the part 14 located in the workpiece nest 22. It should be recognized that the drive arbor 40, 42 can move the cutting tool 12 longitudinally into engagement with an inside surface 16 of the workpiece 14 to be machined. The movement of the cutting tool 12 is not impeded by continued engagement with the supporting swing arm assembly 66, as was the practice in prior known support configurations often referred to in the trade as a hanger, support bracket or holding shaft. Eliminating continued contact with the swing arm assembly 66 or hanger allows the cutting tool 12 to be maneuvered into any desired position without requiring specially designed enlarged apertures through the workpiece 14 to be machined, and simplifies the processing of the workpiece according to the present invention. The process continues to step 110 where rotation of the cutting tool 12 is stopped after machining of the part 14 is completed. When stopping rotation of the cutting tool 12, the cutting tool 12 is returned to the ready position located axially and radially within the workpiece 14 and is located in a proper angular orientation to be engaged by the carriage 56 with the mount aperture 80 in coaxial alignment with the collet 76 of the at least one cutting tool mount or spear 64 associated with the swing arm assembly 66. The carriage 56 is advanced to engage the cutting tool 12 supported on the arbor 40, 42 at the ready position, so that the collet 76 operably engages through the mount aperture 80 in the cutting tool 12 and is retained by cutter-retention knob 78 in step 112. The process according to the present invention then retracts the arbor 40, 42 out of engagement with the drive aperture 20 formed in the cutting tool 12 leaving the static cutting tool 12 supported independently by the carriage 56 in step 114. In step 116, the carriage 56 is retracted to move the static cutting tool 12 outside of the part 14 through side wall aperture 28 of the workpiece 14 and aperture 30 in wall 32 of the workpiece nest 22 until the carriage reaches the home position. In the home position, the cutting tool 12 is spaced radially from the longitudinal axis of the drive arbor 40, 42.

The machined workpiece 14 is then removed from the workpiece nest 22 in step 118. The cycle can then be repeated for multiple parts using automated or manual loading and unloading workpieces for processing.

If automated change over of workpiece configuration is desired, a frame orientation drive 82 can be provided in order to rotate the frame 44 about the longitudinal axis of the drive arbor 40, 42 or coaxial aperture 38 in order to align or orientate the delivery of the cutting tool 12 through different configurations of side wall apertures 28 formed in the workpiece 14 to be processed. The PC or CNC or electronic controlled machine tool can be programmed to operably orient the frame for proper alignment and delivery of the static cutting tool 12 to different workpiece configurations. Change over between machining different workpiece configurations can be minimized by preprogramming the PC or CNC or electronic controlled machine tool for different configurations and allowing the automatic adjustment of the frame and delivery of the static cutting tool 12 to the different configuration workpieces 14 without interruption of production.

The rotatable swing arm assembly 66 can be driven through an angular arc from the work position, where the cutter tool 12 is moveable between the home position and the ready position, to a service or tool change position as illustrated in FIG. 3. Actuation of the second drive 68 to rotate the swing arm assembly 66 occurs when the carriage 56 is in the home position. The rotatable swing arm assembly 66 can be rotated out of the path of movement between the home position and the ready position in order to position the cutting tool 12 in a location extending outwardly with respect to the frame 44 allowing easy access for servicing or tool change of the cutting tool 12. When in this position, the cutting tool 12 can be serviced by removing the entire cutting tool 12, or by removing and/or replacing individual replaceable cutters located on the cutting tool 12. Different sizes and configurations of cutting tool 12 can be mounted on the collet 76 as required for the particular machining operations to be performed on various configurations of workpieces 14. The at least one sensor/switch 70 can provide an appropriate signal to the PC or CNC or electronic controlled machine tool in order to prevent operation of the machine if the cutting tool 12 is not properly seated and retained by the cutter-retention knob 78 on the collet 76, either during a servicing operation, or during an operation where the cutting tool 12 is being transferred between independent support by the swing arm assembly 66 or arbor 40, 42.

Referring now to FIG. 4, the apparatus 10 according to the present invention can include one or more shock absorbers 84 located to operably engage between the tool carriage and the frame. At least one shock absorber 84 can be operably located adjacent at least one end of travel of the reciprocal tool carrier or carriage 56 with respect to the frame 44. Preferably, at least one shock absorber 84 is located adjacent each end of travel of the reciprocal tool carriage 56 with respect to the frame 44 in order to decelerate the carriage 56 while it approaches the end limit of travel. By way of example and not limitation, a suitable shock absorber is commercially sold as a Compensating Shock Absorber from McMaster Carr located in Elmhurst, Ill. These shock absorbers contain hydraulic fluid to dissipate energy to decelerate fast moving loads in order to bring the speed down to zero, and can automatically adjust for impact loads and speed. It should be recognized by those skilled in the art that other shock absorbing devices and methods can be used without departing from the spirit and scope of the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for delivering a static tool to a position located inside a workpiece to be machined, the tool for machining at least one surface inside of the workpiece, the tool operable in combination with a computer controlled machine having at least one axially movable drive spindle, comprising:
a tool body having at least one cutter and an aperture adapted for receiving the axially movable drive spindle of the computer controlled machine;
a carriage for releasibly supporting the tool body for movement between a home position, where the tool body is spaced from coaxial alignment with the axially movable drive spindle of the computer controlled machine, and a ready position, where the aperture of the tool body is in a coaxially aligned position with respect to the axially movable drive spindle of the computer controlled machine; and
a drive for moving the carriage between the home position and the ready position.

2. The apparatus of claim 1 further comprising:
a releasable lock for holding the tool body supported on the carriage when in the locked position, and for releasing the tool body from the carriage when in the released position.

3. The apparatus of claim 1 further comprising:
a sensor for detecting if the tool body is supported on the carriage in the locked position.

4. The apparatus of claim 1 further comprising:
a frame adapted to be releasibly attached to a fixture for supporting the workpiece to be processed.

5. The apparatus of claim 1 further comprising;
a drive for moving the carriage from the home position to a service position.

6. The apparatus of claim 5, wherein the drive moves the carriage in an arc out of alignment with a path of movement between the home position and the ready position.

7. The apparatus of claim 1 further comprising:
the tool body separated from the carriage and supported by the at least one drive spindle for movement from the ready position to a cutting position for machining at least one inside surface of the workpiece to be processed.

8. An apparatus for delivering a static cutting tool to a position located inside a workpiece to be machined, the cutting tool for machining at least one surface inside of the workpiece, the cutting tool operable in combination with a computer controlled machine having at least one axially movable drive spindle, comprising:
a cutting tool body having at least one cutter and an aperture adapted for receiving the axially movable drive spindle of the computer controlled machine; and
movable carriage means for releasibly supporting the tool body and for transporting the tool body between a home position, where the tool body is spaced from coaxial alignment with the axially movable drive spindle of the computer controlled machine, and a ready position, where the aperture of the tool body is in a coaxially aligned position with respect to the axially movable drive spindle of the computer controlled machine, the carriage means for transferring support of the cuffing tool body with respect to the movable drive spindle of the computer controlled machine when the carriage means is in the ready position.

9. The apparatus of claim 8 further comprising:
drive means for moving the carriage means between the home position and the ready position.

10. The apparatus of claim 8 further comprising:
releasable lock means for holding the tool body supported on the carriage means when in the locked position, and for releasing the tool body from the carriage means when in the released position.

11. The apparatus of claim 8 further comprising:
sensor means for detecting if the tool body is supported on the carriage means in the locked position.

12. The apparatus of claim 8 further comprising:
fixture means for supporting the workpiece to be processed;
frame means for releasibly supporting the movable carriage means from the fixture means.

13. The apparatus of claim 8 further comprising:
at least one fixture, each of the at least one fixture interchangeable with respect to the computer controlled machine for machining different configurations of workpieces to be processed; and
a frame releasibly and adjustably supported with respect to each of the at least one fixture, the frame supporting the movable carriage for movement between the home position and the ready position.

14. The apparatus of claim 8 further comprising:
drive means for moving the carriage from the home position to a service position, wherein the drive means moves the carriage in an arc out of alignment with a path of movement between the home position and the ready position.

15. A process for machining at least one surface inside of a workpiece comprising the steps of:
transferring a carried, separable, static cutting tool body from a movable carriage located at a position inside a workpiece to be machined, the tool body having at least one cutter and defining an aperture adapted for receiving at least one axially movable drive spindle of a computer controlled machine for supporting the tool body independent of the movable carriage after transfer; and
machining at least one surface inside of the workpiece with the tool body supported by, and driven in combination with, the at least one axially movable drive spindle of the computer controlled machine while the tool body is supported by the at least one axially movable drive spindle independent of and separated from the movable carriage.

16. The process of claim 15 wherein the transferring step further comprises the steps of:
releasibly supporting the tool body with the movable carriage;
transporting the tool body with the movable carriage between a home position, where the tool body is spaced from coaxial alignment with the at least one axially movable drive spindle of the computer controlled machine, and a ready position, where the aperture of the tool body is in a coaxially aligned position with respect to the at least one axially movable drive spindle of the computer controlled machine; and
transferring support of the cutting tool body between the carriage and the at least one movable drive spindle of the computer controlled machine when the carriage is in the ready position.

17. The process of claim 15 further comprising the step of:
moving the carriage means between the home position and the ready position with drive means.

18. The process of claim 15 further comprising the steps of:
holding the tool body supported on the carriage means when in the locked position with releasable lock means; and
releasing the tool body from the carriage means when the releasable lock means is in the released position.

19. The process of claim 15 further comprising the step of:
detecting if the tool body is supported on the carriage means in the locked position with sensor means.

20. The process of claim 15 further comprising the steps of:
supporting the workpiece to be processed with fixture means;
releasibly supporting the movable carriage means from the fixture means with frame means.

21. The process of claim 15 further comprising the step of:
supporting each different configuration of workpiece to be processed in at least one fixture, each of the at least one fixture interchangeable with respect to the computer controlled machine; and
supporting the movable carriage for movement between the home position and the ready position with a frame releasibly and adjustably supported with respect to each of the at least one fixture.

22. The process of claim 15 further comprising the step of:
moving the carriage from the home position to a service position with drive means, wherein the drive means moves the carriage in an arc out of alignment with a path of movement between the home position and the ready position.

* * * * *